United States Patent
Jasch

(10) Patent No.: US 6,796,888 B2
(45) Date of Patent: Sep. 28, 2004

(54) POWER TOOL HAVING A RECEPTACLE FOR SECURING A TOOL

(75) Inventor: Michael Jasch, Pfullingen (DE)

(73) Assignee: C. & E. Fein GmbH & Co. KG (DE)

( * ) Notice: Subject to any disclaimer, the term of this patent is extended or adjusted under 35 U.S.C. 154(b) by 189 days.

(21) Appl. No.: 10/003,645

(22) Filed: Nov. 2, 2001

(65) Prior Publication Data

US 2002/0070037 A1 Jun. 13, 2002

(30) Foreign Application Priority Data

Dec. 7, 2000  (DE) .......................................... 100 61 559

(51) Int. Cl.⁷ .............................................. B24B 41/00
(52) U.S. Cl. ...................... 451/342; 451/353; 451/359; 451/360; 451/508; 451/509; 451/510; 451/511; 451/512
(58) Field of Search ................................. 451/353, 359, 451/360, 508, 509, 510, 511, 512

(56) References Cited

U.S. PATENT DOCUMENTS

| | | | |
|---|---|---|---|
| 4,436,254 A | * | 3/1984 | Normann ................. 242/84.21 |
| 4,920,702 A | | 5/1990 | Kloss et al. ................... 51/170 |
| 4,980,976 A | | 1/1991 | Junginger et al. .......... 30/272.1 |
| 5,058,909 A | | 10/1991 | Rudolf et al. ................... 279/8 |
| 5,157,873 A | | 10/1992 | Rudolf et al. ................. 51/158 |
| 6,116,996 A | * | 9/2000 | Yanase ........................ 451/359 |
| 6,132,300 A | * | 10/2000 | Martin ........................ 451/357 |
| 6,277,012 B1 | * | 8/2001 | Halliley ....................... 451/359 |

FOREIGN PATENT DOCUMENTS

| | | |
|---|---|---|
| DE | 1878647 | 8/1963 |
| EP | 0244465 B1 | 11/1986 |
| EP | 369390 A2 | 11/1989 |
| EP | 1034870 A2 | 3/2000 |

* cited by examiner

Primary Examiner—Joseph J. Hail, III
Assistant Examiner—Shantese McDonald
(74) Attorney, Agent, or Firm—St. Onge Steward Johnston & Reens LLP

(57) ABSTRACT

A power tool having a receptacle for securing a tool to a drive shaft thereof is diclosed. The receptacle comprises a receiving opening, preferably being arranged on the tool. The receiving opening engages a securing section preferably being provided in a raised fashion on the drive shaft of the power tool, thereby effecting a positive fit therebetween. The receiving opening has a cross section comprising a plurality of bulges displaced outwardly from a center axis of the drive shaft.

50 Claims, 5 Drawing Sheets

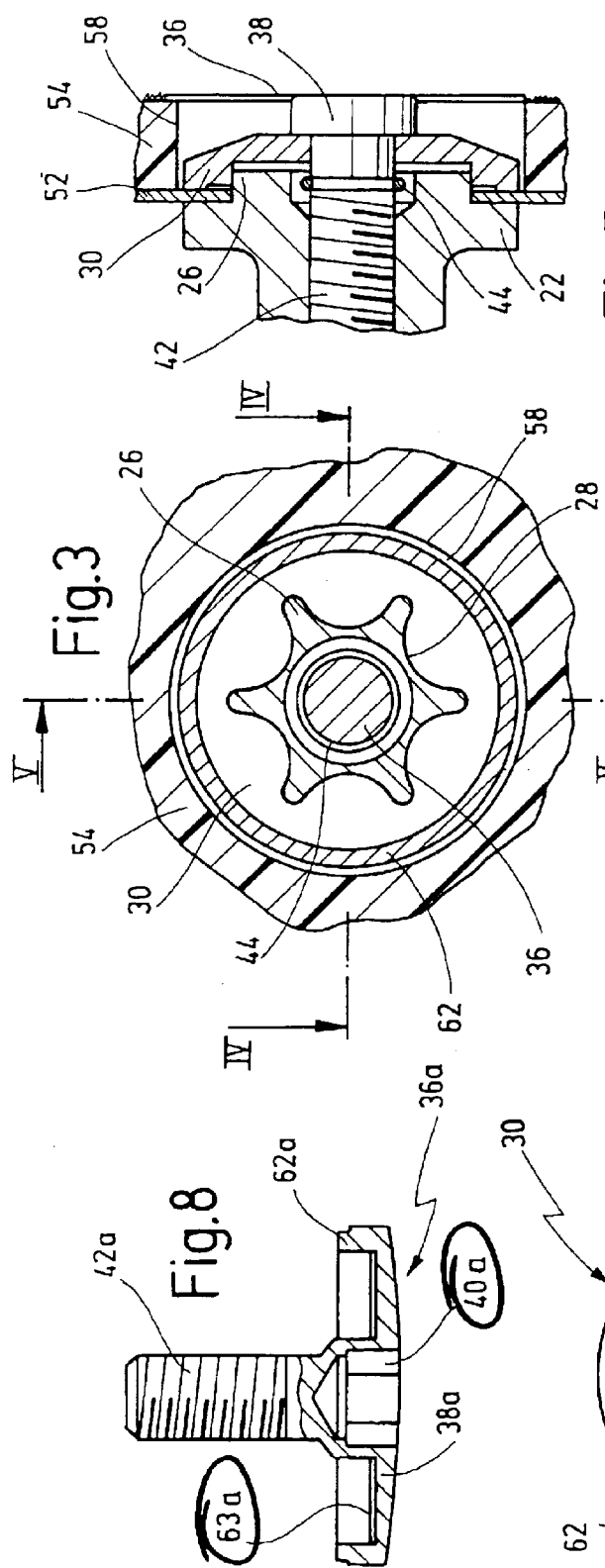

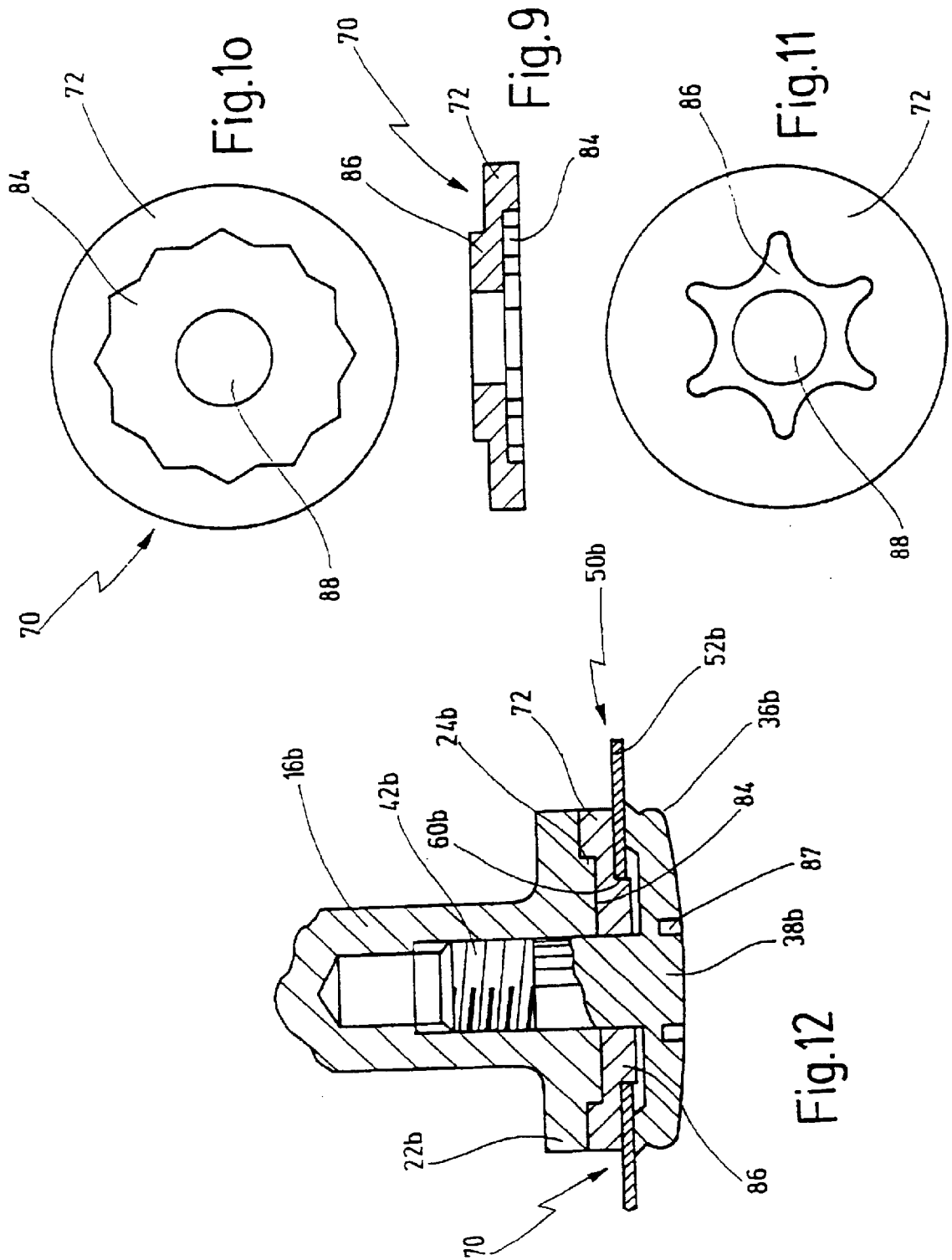

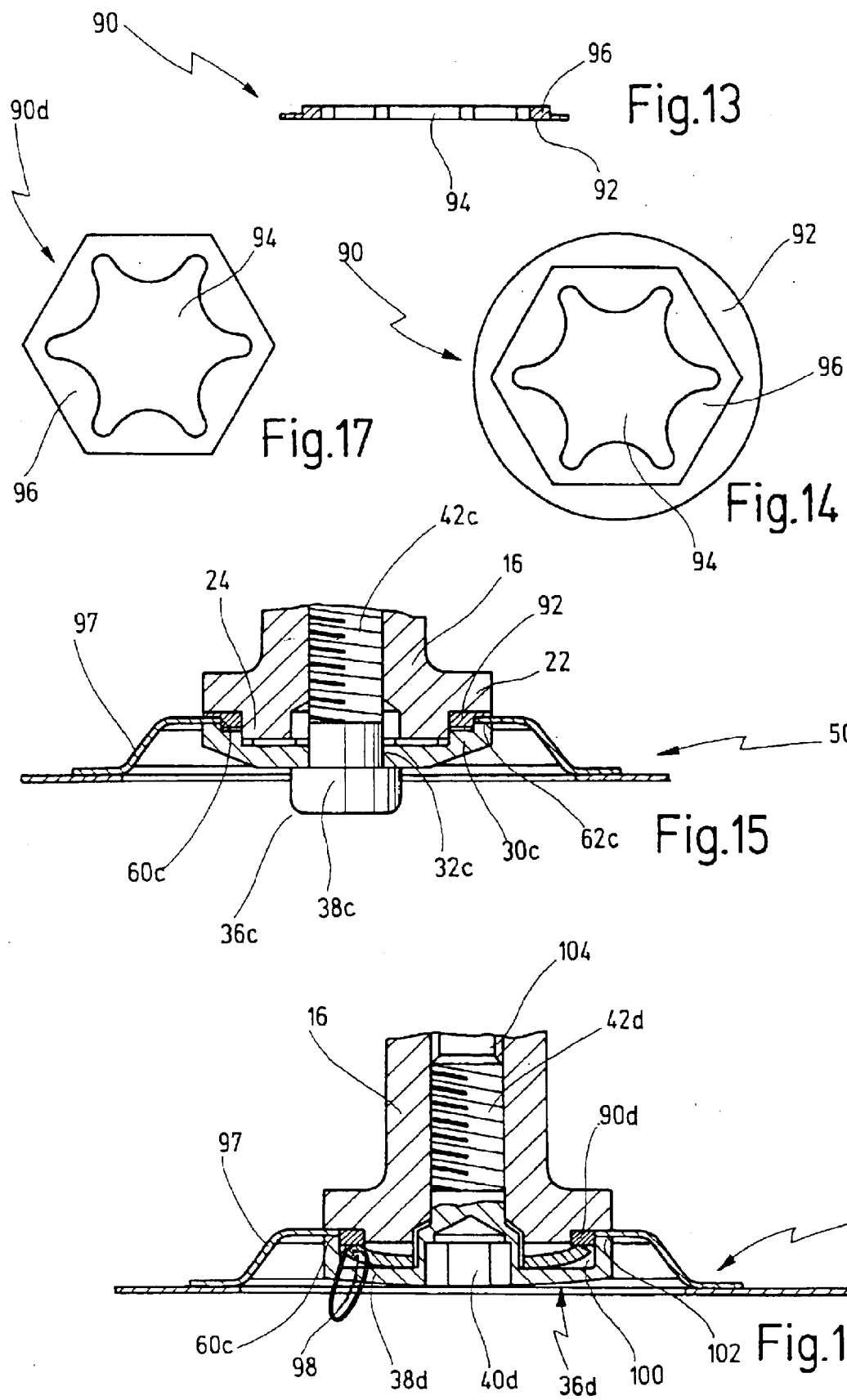

POWER TOOL HAVING A RECEPTACLE FOR SECURING A TOOL

BACKGROUND OF THE INVENTION

The invention relates to a receptacle for securing a tool to a drive shaft of a power tool, a receiving opening being arranged on the tool or on the drive shaft, and a center axis of the drive shaft extending therethrough, the opening co-acting with a suitably formed securing section arranged in a raised fashion at the other one of the two elements, in order to form a positive engagement for transmitting a torque between the drive shaft and the tool.

The invention further relates to a suitable adapter that can be used, if the receiving opening and the securing section of the tool or of the drive shaft are not mated with each other.

A receptacle of the type mentioned at the outset is known from U.S. Pat. No. 4,980,976 which discloses a U-shaped angled cutting knife for severing adhesive beads in window panes of motor vehicles, the cutting knife having a star-shaped receiving opening in the shape of a regular polygon for securing an oscillatingly driveable drive shaft, the receiving opening being attachable to a suitably shaped securing section of the drive shaft. For securing the cutting knife after attaching to the securing section of the drive shaft with its receiving opening, a screw connection is provided, e.g. in form of a nut that can be screwed onto a screw neck of the drive shaft.

Such a receptacle for securing the tool to the drive shaft is provided in particular for oscillatingly driveable tools, in which a positive fit engagement between the drive shaft and the tool for the transmission of higher torques is required.

To this end, a plurality of tools are used, which cannot only be used as cutting knives, but also for other tasks, e.g. for sawing. By means of such oscillatingly driven saw blades, for example, precise cuts in car body working can be performed. For sawing in hard accessible locations, also finger-like tools are used, for instance in order to be able to perform special cuts in wood constructional work. Another field of application is grinding, as e.g. described in U.S. Pat. No. 4,920,702, or scraping.

It has turned out to be disadvantageous that the known receptacle for engagement between the tool and the drive shaft, in particular for such oscillatingly driven tools, tends to wear out after longer operation under high load.

SUMMARY OF THE INVENTION

It is a first object of the invention, to create an improved power tool having an improved receptacle for engagement between the drive shaft and the tool.

It is a second object of the invention, to create an improved receptacle in which the danger of wear out of the receiving opening is reduced and a transmission of high torques is guaranteed also in long-term operation.

It is a third object of the invention, to provide an improved power tool having a receptacle for a tool that is particularly suited for the transmission of high torque even when oscillatinly driven back and forth about a longitudinal axis.

It is a further object of the invention to provide a tool having an improved receptacle in which the danger of wear out of the receiving opening is reduced and a transmission of high torques is guaranteed also in long-term operation.

It is another object of the invention to provide a tool having an improved receptacle for securing to a power tool allowing the transmission of high torque even when oscillatinly driven back and forth about a longitudinal axis.

It is a further object of the invention to provide an adapter that can be used for the engagement between the tool and the drive shaft, if the shapes of the receiving opening and the securing section on the tool and on the drive shaft are not mated with each other.

These and other objects are achieved according to the invention by a receptacle with a receiving opening the shape of which is mated to a securing section of the drive shaft of the power tool, the securing section and the receiving opening having a plurality of bulges arranged at a radial distance from the longitudinal axis of the drive shaft, the bulges being, preferably, continuously connected by lateral flanks forming recesses between the bulges. The bulges may, preferably, be configured as rounded tips.

The object of the invention is in that way completely achieved.

By means of the new shape, namely, the occurrence of high torques and/or high surface pressures on any sharp edges like a regular polygon, used in prior art devices, is avoided. Instead, the torque is now mainly transmitted to the tool by lateral flanks forming recesses between the bulges.

By means of such a shape, lumped loads and, thus, high surface pressures are avoided, which occurred up to now in receiving openings in the form of regular polygons.

In that way, a reliable engagement between the tool and the drive shaft is created, by means of which extraordinarily high torques can be transmitted even with oscillating drives or with impact loads, without any danger that the receiving-opening or of the securing section may wear out.

In a preferred embodiment of the invention, the receiving opening has at least three, preferably six rounded tips pointing outwardly, with two adjacent tips being connected by a curved section, which extends to the center axis. Each pair of adjacent tips may be connected by lateral flanks extending from the pair of tips toward the longitudinal axis and converging in a common apex.

By means of such an embodiment, a particularly constant torque transmission is reached, which avoids high surface pressures.

In an additional improvement of the invention, the curved sections are configured in an arch-shaped, preferably in a circular arc-shaped manner.

According to another embodiment of the invention, the diameter ratio between a first diameter, determined by a circle on which the tips are arranged, and between a second diameter, determined by a circle on which the apexes are arranged, is approximately 4 to 6, preferably approximately 4.5 to 5.5, in particular approximately 5.1.

In another embodiment of the invention, the ratio between the first diameter ratio that is determined by the distance between two tips being opposite to each other and a radius of the arc-shaped rounded tips is approximately 30 to 46, preferably approximately 34 to 42, in particular approximately 37.

By means of these features, a particularly favorable torque transmission between the drive shaft and the tool can be guaranteed, without any danger of wearing out under oscillating load or impact load.

Preferably, the receiving opening is arranged on the tool and the securing section is arranged on the drive shaft.

In that way, a simple manufacture can be reached particularly by punching the receiving opening out of the tool.

According to another embodiment of the invention, the receptacle comprises a securing screw, which can be screwed into a threaded blind hole of the drive shaft.

In this way, the securing screw has preferably a head, which is dimensioned for being positioned onto the tool.

In an additional improvement of the invention, a clamping flange is provided, which has a central opening for receiving the securing screw and which has an annular protrusion on its side facing the drive shaft, the annular protrusion being dimensioned for positioning onto the tool.

By means of this measure, a good pressure for securing can be reached.

In an additional improvement of this embodiment, the clamping flange has a recess on its side facing the drive shaft, the recess being mated in its form and size with the securing section of the drive shaft.

In a further embodiment of the invention, the clamping flange is secured rotatably to the securing screw.

In that way, the handling is facilitated.

If the securing section is provided at the drive shaft of the power tool, the drive shaft has preferably a retaining flange at its tool side, the securing section being arranged at the side of the retaining flange facing the tool.

In that way, the tool can be screwed to the drive shaft, with the retaining flange serving as a supporting surface.

The object of the invention is further achieved by an adapter for clamping a tool, comprising a receiving opening being arranged on a drive shaft of a power tool, which has a securing section, wherein the shape of the receiving opening is not mated with the form of the securing section, having preferably the form of a regular polygon, wherein an adapter disk is provided on the first side of which a recess is provided, which is mated to the form of the securing section at the drive shaft in order to form a positive fit engagement with same, and on the second side of which a raised second securing section is provided which corresponds to the shape described before.

By using such an adapter, it is possible to use tools, that have already been provided with the receptacle according to the invention on power tools, with drive shafts that have a known securing section, e.g. the shape of a polygon. In that way, it is ensured that not all power tools already acquired by users need to be exchanged, if the new tools with the securing section according to the invention are to be used to this end.

In an additional improvement of this embodiment, the adapter comprises a clamping flange, which comprises a central opening for receiving a securing screw that can be screwed into the drive shaft, the clamping flange having an annular protrusion on the side of the tool, the annular protrusion being dimensioned for being positioned onto the tool.

To this end, the adapter disk comprises preferably a central opening for receiving a securing screw that can be screwed into the drive shaft.

The object of the invention is further achieved by an adapter for clamping a tool, comprising a receiving opening at a drive shaft of a power tool, which has a securing section of the shape according to the invention, wherein the form of the receiving opening is not mated with the form of the securing section, having preferably the form of a regular polygon, characterized by a securing section, which is mated with the form of the receiving opening of the tool and which is interspersed by a receiving opening of the shape according to the invention, which is mated with the securing section of the drive shaft.

By means of such an adapter it is made possible to clamp tools of common design that have a receiving opening of different shape, e.g. the shape of a regular polygon, onto a power tool with a drive shaft that has a securing section according to the invention.

In an additional improvement of this embodiment, the adapter comprises a clamping flange, which has a central opening for receiving a securing screw that can be screwed into the drive shaft, the clamping flange having an annular protrusion on the side of the tool, the annular protrusion being dimensioned for being supported on the tool.

In that way, an even distribution of power and a good pressure can be guaranteed when the tool is secured by means of a securing screw.

In an advantageous improvement of this embodiment, the clamping flange is secured rotatably to the securing screw.

In that way, the handling of the adapter is facilitated.

In another embodiment of the invention, the adapter comprises an adapter disk laterally projecting flange-like, on which the securing section is configured, wherein a spring element is arranged between the securing screw and the adapter disk, the spring element acting on the adapter disk.

By means of this measure, a detaching of the securing screw is prevented even after longer operation under the most different operation conditions, and a good pressure of the tool onto the drive shaft is guaranteed.

According to an alternative embodiment, the adapter has a securing screw, which can be screwed into a threaded blind hole of the drive shaft, the securing screw having a head that is dimensioned for being positioned onto the tool.

In that way, a clamping flange can be omitted and the function of same is taken over already by the securing screw itself. Also by this measure, an even distribution of power and a good contact of the tool onto the drive shaft is guaranteed.

It is to be understood that the features mentioned above and those yet to be explained below can be used not only in the respective combinations indicated, but also in other combinations or in isolation, without leaving the scope of the present invention.

SHORT DESCRIPTION OF THE DRAWINGS

Further features and advantages of the invention can be taken from the following description of preferred embodiments with reference to the drawings. In the drawings:

FIG. 3 shows a cross section through the receptacle of the power tool according to FIG. 1 with a tool attached thereto;

FIG. 4 shows a section according to line IV—IV according to FIG. 3;

FIG. 5 shows a section according to line V—V according to FIG. 3;

FIG. 6 shows a view of the clamping flange used in the receptacle according to FIG. 3 through 5 from its side facing the drive shaft;

FIG. 7 shows a cross section of the clamping flange according to FIG. 6;

FIG. 8 shows an alternative embodiment of a securing screw for use with the receptacle according to FIG. 1 and 2;

FIG. 9 shows a cross section through an adapter for securing a tool with a receiving opening according to the invention to a drive shaft of a power tool of common design having a differently shaped securing section;

FIG. 10 shows a view onto the adapter according to FIG. 9 seen from the drive shaft;

FIG. 11 shows a view of the adapter seen from its outer side facing the tool;

FIG. 12 shows a section through the outer region of a drive shaft having a tool applied thereto using the adapter according to FIG. 9 therebetween, shown in installation position;

FIG. 13 shows a cross section of another adapter for securing tools with commonly shaped receiving openings to power tools, the drive shafts of which being provided with securing sections formed according to the invention;

FIG. 14 shows a view of the adapter according to FIG. 13 from its side facing away from the drive shaft;

FIG. 15 shows a section through a drive shaft, having the tool applied thereto using the adapter therebetween, shown in installation position;

FIG. 16 shows an embodiment that is slightly modified in comparison to the embodiment according to FIG. 15 for securing the tool to the drive shaft by using a modified adapter therebetween, shown in longitudinal section in installation position;

FIG. 17 shows a top view of the adapter according to FIG. 16;

DETAILED DESCRIPTION OF THE PREFERRED EMBODIMENTS

Figure 1:
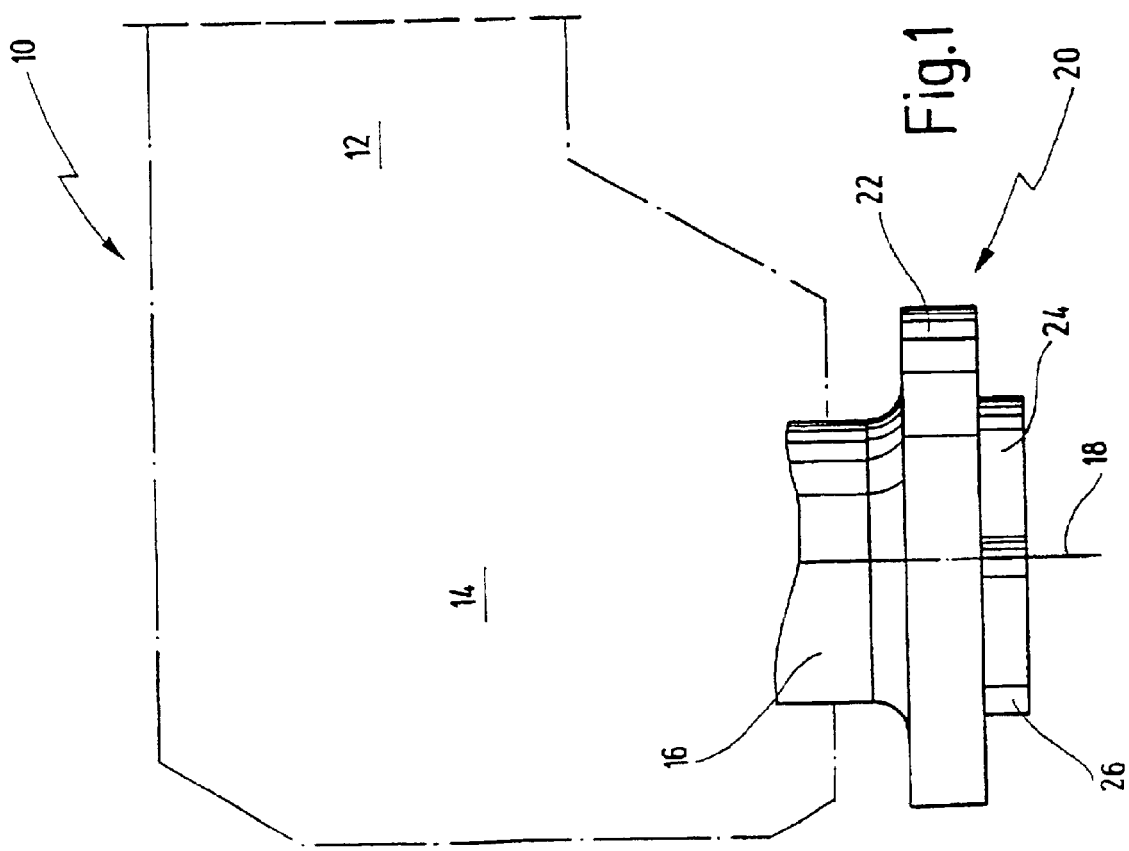
FIG. 1 shows a very simplified, schematic view of a power tool, the drive shaft of which is provided with a receptacle according to the invention for securing a tool.

In FIG. 1, a power tool, which is altogether designated with the numeral 10, is shown in a very schematic fashion. Power tool 10 comprises a drive that is indicated with the numeral 12, which drives a drive shaft 16 via a gear that is indicated with 14. Drive shaft 16 comprises a retaining flange 22 that serves to axially support a tool that shall be secured onto a securing section 24 protruding outwardly therefrom. The retaining flange has an outer diameter that is larger than the diameter of securing section 24. Onto securing section 24 of drive shaft 16, a tool not shown in FIGS. 1 and 2 can be applied from the outward and can be screw-connected with drive shaft 16.

In the present case, power tool 10 is configured such that drive shaft 16 is driven by gear 14 in an oscillating movement back and forth about its longitudinal axis or center axis 18 with a high frequency of e.g. approximately 5000 to 30,000 oscillations per minute and with a small pivot angle of e.g. approximately 0.5° to 5°.

In order to allow a positive engagement between tool and drive shaft 16, securing section 24 of drive shaft 16 has a special shape, by which, together with a suitably formed receiving opening of the tool, a positive fit between tool and drive shaft 16 is reached.

Figure 2:
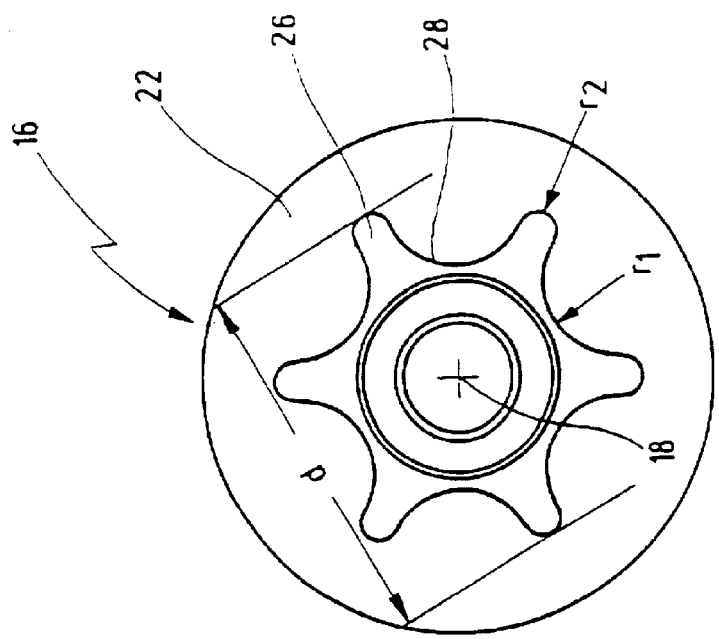
FIG. 2 shows a view onto the drive shaft according to FIG. 1 from the outside.

The form of the securing section, which corresponds to the shape of the receiving opening of the tool, can be seen in more detail in FIG. 2.

The securing section comprises altogether six rounded tips 26 or bulges, which are arranged around center axis 18 of drive shaft 16 in regular angular intervals of 60°, respectively. In this case, each pair of adjacent rounded tips 26 is connected via curved sections or lateral flanks 28, which extend forward toward center axis 18, thereby forming a recess between the pair of tips. Each pair of adjacent rounded tips 26 or bulges is continuously connected by the curved sections 28. The term "continuously" is to be understood in its mathematical meaning, i.e. without having any discrete interruptions, such as steps. Curved sections 28 are configured in an arc-shaped fashion, and converge in a common apex which is closest to the center axis 18. The curved sections 28 pass over into the rounded tips 26, which are, on their part, also curved in an arc-shaped fashion. The shape of the securing section defined in this way is a regular polygon with rounded tips and curved side flanks.

For securing section 24 shown in FIG. 2, the distance designated as d between the outermost ends of two rounded tips 26 being opposite to each other (this being equal to the diameter of a circle defined by the tips 26), is about 18 mm. The curved radius $r_1$ of curved sections 28 between two adjacent rounded tips 26 is in the case shown approximately 3.56 mm. By contrast, the curved radius $r_2$ of each rounded tip 26 is approximately 0.95 mm.

It is to be understood that the shape of a receiving opening of a tool to be applied onto securing section 24 is directly mated with securing section 24 in order to guarantee a reception and a positive fit engagement. The tolerances of the corresponding receiving opening are mated with the shape of securing section 24 in a suitable manner in order to guarantee a good entraining, but, however, to prevent jamming.

For example, the dimension d, i.e. the distance of two tips being opposite to each other, could be approximately 18.1 mm, whereas for the curved radius $r_1$ a radius of approximately 3.53 mm could be used and for the radius of the rounded tips a radius of approximately 1.0 mm.

By means of such a positive fit engagement between receiving opening and securing section, a positive force transmission between tool and drive shaft is made possible, wherein, at the same time, the danger that the receiving opening or the rounded tips of the securing section wear out is prevented even when high torques are transmitted under oscillating load or even under impact load. This is mainly achieved by the fact that the lateral flanks of curved sections 28 extend almost radially in partial sections.

It is to be understood that the ratios between distance d between two rounded tips 26 on the one hand and the curved radii of curved sections 28 and/or of the rounded tips 26 on the other hand can be varied by large amounts, without losing the advantages of the reliable and constant force transmission. Furthermore, also more or less than six tips 26, which are preferably rounded, may be provided.

The securing of a tool to a tool drive shaft 16 with a securing section 24 according to FIGS. 1 and 2 is explained in more detail in the following with reference to FIGS. 3 to 7.

Tool 50 is configured as a triangle-shaped grinding plate having lateral edges that are curved outwardly in a convex fashion such as known from U.S. Pat. No. 4,920,702 which is completely incorporated by reference herein.

Tool 50 comprises a securing plate 52, which can, for example, consist of aluminum, and on the bottom part of which a flexible pad 54 is provided, which may, for example, consist of a polyurethane foam. At the outer side of pad 54, a receiving surface 56 is provided, which can e.g. be equipped with a Velcro support for receiving a suitably formed abrasive paper. Alternatively, an abrasive paper could be fixed onto pad 54 by glueing. Securing plate 52 of tool 50 is provided with a receiving opening 60, which corresponds to the shape explained with reference to FIG. 2 and which is suitably mated in its size. Within pad 54, further, a recess 58 is provided, which allows to secure tool 50, having securing plate 52 applied onto securing section 24, from the outside by applying a clamping flange 30 and to fix same by means of a central securing screw 36, which is screwed into drive shaft 16.

As already mentioned before, the shape of receiving opening 60 in securing plate 52 of tool 50 is mated with the shape of securing section 24 of drive shaft 16. Clamping flange 30 comprises a central opening 32 for receiving the securing screw 36 which may be standardized.

On its side facing drive shaft 16, clamping flange 30 further comprises a recess 34, the shape and size of which is also mated with the shape of securing section 24 of drive shaft 16. Thus, not only securing plate 52, but also clamping flange 30 is positively engaged with securing section 24 of drive shaft 16. Securing screw 36 extends through opening 32 and engages clamping flange 30 in a captive manner, on the side of drive shaft 16, via a retaining ring 44. Within head 38 of securing screw 36, which is, together with clamping flange 30, completely countersunk within recess 58 of pad 54, a hexagon socket 40 is provided in order to allow an actuation of screw 36 from outside. In the assembled state shown in FIGS. 4 and 5, securing screw 36 is screwed with its threaded section 42 into a threaded blind hole 64 of drive shaft 16.

In order to guarantee a good surface pressure between clamping flange 30 and securing plate 52, when securing plate 52 is pressed against retaining flange 22 of drive shaft 16 and, at the same time, to prevent securing screw 36 from being released in operation, clamping flange 30 comprises on its side facing drive shaft 16 a groove 63 of low depth, thereby forming an annular protrusion 62, which remains at the outer circumference and protrudes into the direction of drive shaft 16.

The shape of the clamping flange can additionally be seen in more detail in FIGS. 6 and 7.

Instead of using a clamping flange 30, there is also, of course, the possibility to secure tool 50 directly to drive shaft 16 by means of a securing screw, having a suitably formed head.

Such a securing screw 36a is shown in FIG. 8.

Head 38a of securing screw 36a is widened in a flangelike fashion, e.g. in the form of clamping flange 30 described above. Head 38a is provided with an annular-shaped groove 63a at its side facing drive shaft 16, so that, at the outer edge, an annular protrusion 63a remains, by means of which head 38a can be directly pressed onto securing plate 52 of tool 50. Head 38a is, again, equipped with a hexagon socket 40a.

By means of FIGS. 9 through 12, an adapter will be explained in the following, which allows a tool, that is equipped with a receiving opening formed according to the invention, to be clamped onto the drive shaft of a power tool, the power tool being equipped with a securing section of known design, e.g. in form of a hexagon. In that way, tools provided with the new receptacle can also be used for already existing power tools, whereby it can be prevented that different tools have to be manufactured beside one another, as, for existing power tools, of course, suitable tools still have to be provided.

The adapter designated altogether with the numeral 70 comprises an adapter disk 72, the form of which can be seen in FIG. 9 through 11 in more detail. Adapter disk 72 has a recess 84 on its side facing the drive shaft, this recess being mated in its shape and size with the shape of securing section 24b of drive shaft 16b according to FIG. 12. In the shown case, securing section 24b of drive shaft 16b is configured in hexagon shape, while recess 84 is configured in the form of a hexagon comprising, however, altogether twelve outer corners, so that, altogether, a star-shaped form is achieved, as can be seen from FIG. 10. Instead, also a hexagon-shaped recess could be used, which corresponds directly to the form of securing section 24b. On the opposite side facing away from drive shaft 16b, adapter disk 72 is equipped with a raised protruding securing section 86, which corresponds to the form of the receptacle with rounded tips according to the invention. Tool 50b comprises, according to FIG. 12, a correspondingly formed receiving opening 60b, which allows a positive engagement with securing section 86 of adapter disk 72.

Again, a securing screw 36b is used for securing tool 50b onto drive shaft 16b. Securing screw 36b corresponds largely to securing screw 36b described with reference to FIG. 8. However, in modification of the embodiment described in FIG. 8, no hexagon socket is provided at the outside, but two recesses 87, into which a socket wrench can be inserted. In modification of the tool described with reference to FIGS. 4 and 5, tool 50b can be, for example, a cutting tool, at the securing section or at securing plate 52b of which receiving opening 60b is provided. Again, securing screw 36b is screwed into drive shaft 16b with its threaded section 42b.

With reference to FIGS. 13 through 15, another adapter 90 is explained, which can be used for clamping common tools onto power tools, the drive shaft of the power tools being provided with a securing section according to the invention, the receiving opening of these common tools having e.g. the form of a regular polygon according to FIG. 10.

Adapter 90 comprises an adapter disk 92, which is penetrated by a receiving opening 94 of the shape according to the invention and by which the adapter disk can be positively received by securing section 24 of drive shaft 16. As can be seen from FIGS. 13 and 14, adapter disk 92 comprises, on its side facing away from drive shaft 16, a securing member 96, which is configured in a hexagon-shaped fashion and which protrudes in a raised manner from the surface of adapter disk 92 into the direction of the tool and within which receiving opening 94 is provided.

In a state assembled with a tool 50c by using adapter disk 92 in between, the arrangement according to FIG. 15 is achieved.

Tool 50c can e.g. be a saw blade, which has in its center a conically protruding securing section 97, within which a hexagon-shaped or a star-shaped receiving opening 60c with six edges and twelve outer corners according to FIG. 10 is provided. The screw-connection with drive shaft 16 is either effected by using a clamping flange 30c according to FIG. 15 or by using a securing screw 36d, according to FIG. 16, which corresponds approximately to the securing screw according to FIG. 8.

According to FIG. 15, a clamping flange 30c is provided, having an annular protrusion 62c, which presses the securing member against adapter disk 92 and/or against retaining flange 22 of drive shaft 16.

For securing to drive shaft 16, a securing screw 36c is provided having a head 38c, in which a hexagon socket (not shown) is provided, the securing screw 36c being screwed into drive shaft 16 with its threaded section 42c.

In FIGS. 16 and 17, an alternative securing possibility is shown for securing tool 50c by using a slightly modified adapter 90d.

In that embodiment, a separate clamping flange 30c is omitted. Instead, head 38d of securing screw 36d is configured in a flange-like manner. Head 38d of securing screw 36d comprises an annular shoulder 102, which biases securing section 97 of tool 50c against adapter 92d. Unlike FIG. 14, adapter 90d according to FIG. 17 does not comprise a flange-like adapter disk, but is, at its outer side, merely equipped with securing member 96 according to FIG. 14, which fits into receiving opening 60c of tool 50c.

Additionally, in a recess 100 a spring element 98, in form of a disk spring is received, on the side of head 38d facing drive shaft 16, the spring element resting on adapter 90d. When securing screw 36d is tightened by using a hexagon socket screw key that can be inserted into hexagon socket 40d, spring element 98 is, thus, biased against adapter 90d and prevents a releasing of securing screw 36d in operation.

Figure 18:
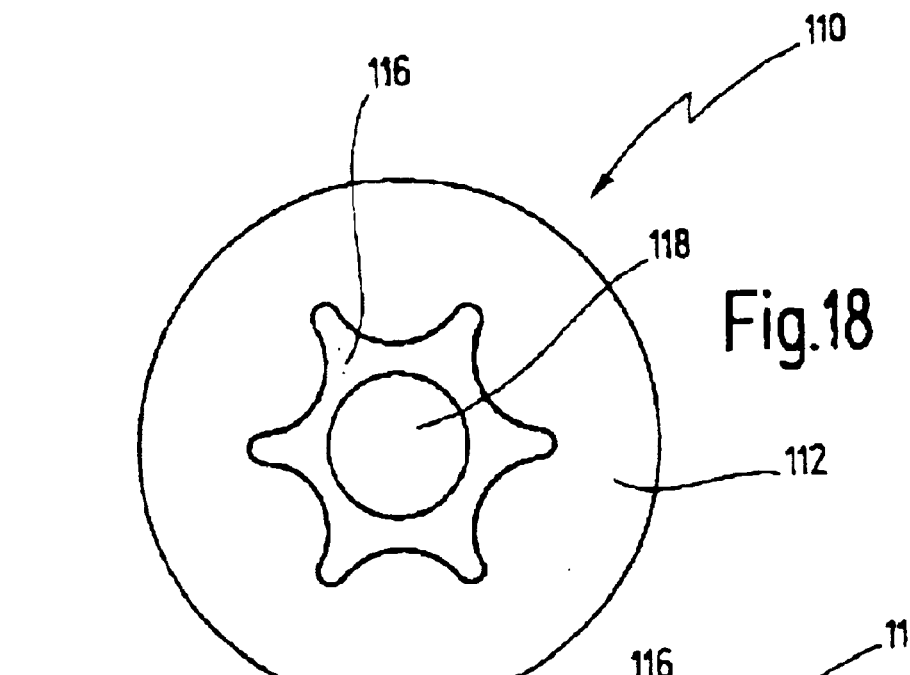
FIG. 18 shows a top view of a different embodiment of an adapter.
Figure 19:
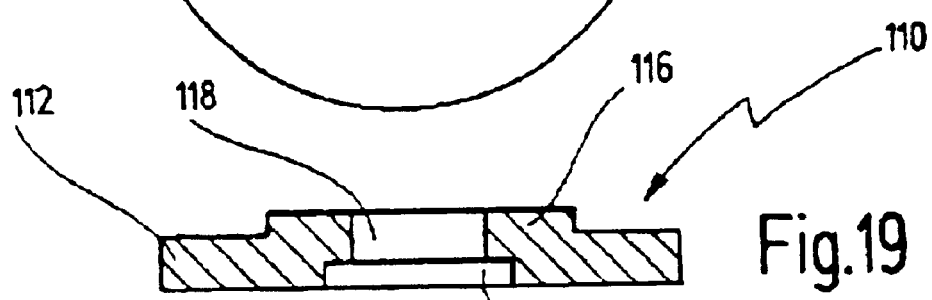
FIG. 19 shows a cross section of the adapter of FIG. 18.
Figure 20:
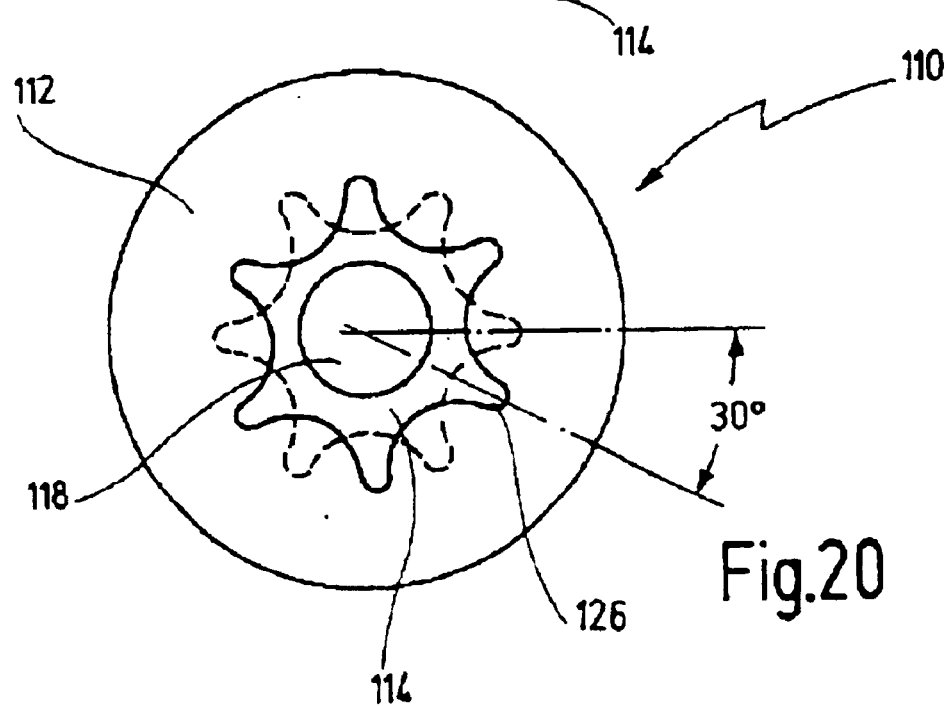
FIG. 20 shows a bottom view of the adapter of FIG. 18.

In FIGS. 18 through 20, another embodiment of an adapter according to the invention is shown.

The adapter 110 comprises an adapter disk 112, from the top side thereof a securing section 116 protrudes having a shape identical to the shape of securing section 86 of the adapter according to FIG. 9.

On the bottom side thereof, a recess 114 is provided, also having the identical form, however, being angularly displaced with respect to the securing section 116 by 30°. In FIG. 20, the angular displacement of 30° is shown in more detail by also including the securing section 116 of the opposed top side in dashed lines. The tips 126 of the securing section 116 and the recess 114 are angularly displaced by 30°, as can easily be seen.

The adapter 110 also includes a central opening 118 for inserting a screw therethrough to threadedly engage a respective threaded hole on the drive shaft.

Such an adapter can be used, if angular displacements between the tool and the drive shaft other than the 60° allowed by the six tips are intended. While without such an adapter the tool can only angularly be displaced on the securing section of the drive shaft by increments of 60°, now increments of 30° become possible.

What is claimed is:

1. A power tool comprising
a motor-driven drive shaft having a longitudinal axis and having a free end;
a securing section provided on said free end of said drive shaft for engaging a receiving opening provided on said tool;
said securing section comprising six rounded tips arranged at even radial distances from said longitudinal axis, at angular intervals of 60° between each other, each pair of adjacent tips being connected by arch-shaped lateral flanks forming recesses between said tips, said lateral flanks extending from said pair of adjacent tips toward said longitudinal axis and converging in a common apex.

2. A power tool comprising
a motor-driven drive shaft having a longitudinal axis and having a free end;
a securing section provided on said free end of said drive shaft for engaging a receiving opening provided on said tool;
said securing section comprising a plurality of bulges arranged at a radial distance from said longitudinal axis, said bulges being connected by lateral flanks forming recesses between said bulges;
wherein said securing section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and
wherein said securing section comprises at least six bulges, each pair of adjacent bulges being connected by lateral flanks extending from said pair of adjacent bulges toward said longitudinal axis and converging in a common apex.

3. The power tool of claim 2, wherein said bulges define a first circle having a first diameter, and wherein said apexes define a second circle having a second diameter, the ratio of said first and second diameters defining a diameter ratio, said diameter ratio being approximately 4 to 6.

4. The power tool of claim 3, wherein said diameter ratio is 4.5 to 5.5.

5. The power tool of claim 3, wherein said diameter ratio is approximately 5.1.

6. The power tool of claim 2, wherein said bulges have, in part, a circular arc shape having a certain radius, the ratio between said first diameter and said radius being approximately 30 to 46.

7. A power tool comprising
a motor-driven drive shaft having a longitudinal axis and having a free end;
a securing section provided on said free end of said drive shaft for engaging a receiving opening provided on said tool;
said securing section comprising a plurality of bulges arranged at a radial distance from said longitudinal axis, said bulges being connected by lateral flanks forming recesses between said bulges;
wherein said securing section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and
wherein said bulges are configured as rounded tips.

8. A power tool comprising
a motor-driven drive shaft having a longitudinal axis and having a free end;
a securing section provided on said free end of said drive shaft for engaging a receiving opening provided on said tool;
said securing section comprising a plurality of bulges arranged at a radial distance from said longitudinal axis, said bulges being connected by lateral flanks forming recesses between said bulges;
wherein said securing section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and
wherein said lateral flanks are arch-shaped.

9. A power tool comprising
a motor-driven drive shaft having a longitudinal axis and having a free end;
a securing section provided on said free end of said drive shaft for engaging a receiving opening provided on said tool;

said securing section comprising a plurality of bulges arranged at a radial distance from said longitudinal axis, said bulges being connected by lateral flanks forming recesses between said bulges;

wherein said securing section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said lateral flanks are circular arc-shaped.

10. A power tool comprising a motor-driven drive shaft having a longitudinal axis and having a free end;

a securing section provided on said free end of said drive shaft for engaging a receiving opening provided on said tool;

said securing section comprising a plurality of bulges arranged at a radial distance from said longitudinal axis, said bulges being connected by lateral flanks forming recesses between said bulges;

wherein said securing section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and a threaded blind hole arranged on said drive shaft, and further comprising a securing screw adapted for screwing into said threaded blind hole for securing a tool on said securing section.

11. A power tool comprising, a motor-driven drive shaft having a longitudinal axis and having a free end;

a securing section provided on said free end of said drive shaft for engaging a receiving opening provided on said tool;

said securing section comprising at least three bulges arranged at a radial distance from said longitudinal axis, each of said bulges forming a pair of bulges with each adjacent bulge, each said pair of adjacent bulges being continuously connected by lateral flanks forming recesses between said bulges and extending from said pair of adjacent bulges toward said longitudinal axis and converging in a common apex;

a threaded blind hole arranged on said drive shaft; and a securing screw adapted for screwing into said threaded blind hole for securing a tool on said securing section;

wherein said drive shaft further comprises a retaining flange having an outer diameter being larger than an outer diameter of said securing section, thereby allowing fixation of a tool on said securing section by pressing said tool against said retaining flange when tightening said securing screw.

12. The power tool of claim 11, wherein said securing screw comprises a head allowing to secure a tool between said retaining flange and said head when tightening said screw.

13. A power tool comprising, a motor-driven drive shaft having a longitudinal axis and having a free end;

a securing section provided on said free end of said drive shaft for engaging a receiving opening provided on said tool;

said securing section comprising at least three bulges arranged at a radial distance from said longitudinal axis, each of said bulges forming a pair of bulges with each adjacent bulge, each said pair of adjacent bulges being continuously connected by lateral flanks forming recesses between said bulges and extending from said pair of adjacent bulges toward said longitudinal axis and converging in a common apex;

a threaded blind hole arranged on said drive shaft;

a securing screw adapted for screwing into said threaded blind hole for securing a tool on said securing section; and a clamping flange configured detachable from said drive shaft and having a central opening for inserting a threaded portion of said securing screw therethrough, said clamping flange further comprising an annular protrusion on its side facing said drive shaft, said annular protrusion being dimensioned for pressing a tool against said retaining flange when tightening said securing screw.

14. The power tool of claim 13, wherein said clamping flange comprises a recess on its side facing said drive shaft, the recess being mated to the shape of said securing section the drive shaft for positively engaging said securing section.

15. The power tool of claim 13, wherein said clamping flange is secured rotatably to said securing screw.

16. A tool comprising a receiving opening defining a longitudinal axis extending therethrough, said receiving opening comprising a plurality of bulges arranged at a radial distance from said longitudinal axis, said bulges being connected by lateral flanks forming recesses between said bulges, wherein said securing section comprises at least six bulges, each pair of adjacent bulges being connected by lateral flanks extending from said pair of adjacent bulges toward said longitudinal axis and converging in a common apex.

17. The tool of claim 16, wherein said bulges are configured as rounded tips.

18. The tool of claim 16, wherein said bulges define a first circle having a first diameter, and wherein said apexes define a second circle having a second diameter, the ratio of said first and second diameters defining a diameter ratio, said diameter ratio being approximately 4 to 6.

19. The tool of claim 18, wherein said diameter ratio is 4.5 to 5.5.

20. The tool of claim 18, wherein said diameter ratio is approximately 5.1.

21. The tool of claim 16, wherein said bulges have a circular arc shape having a certain radius, the ratio between said first diameter and said radius being approximately 30 to 46.

22. A tool comprising a receiving opening defining a longitudinal axis extending therethrough, said receiving opening comprising a plurality of bulges arranged at a radial distance from said longitudinal axis, said bulges being connected by lateral flanks forming recesses between said bulges;

wherein said securing section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said lateral flanks are arch-shaped.

23. A tool comprising a receiving opening defining a longitudinal axis extending therethrough, said receiving opening comprising a plurality of bulges arranged at a radial distance from said longitudinal axis, said bulges being connected by lateral flanks forming recesses between said bulges;

wherein said securing section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said lateral flanks are circular arc-shaped.

24. An adapter for securing a tool having a receiving opening to a securing section of a drive shaft of a power tool, said adaoter comprising:

an adapter disk comprising a longitudinal axis and having a first side facing said power tool and a second side facing said tool;

a recess arranged on said first side, and having a certain shape for engaging said securing section of said power tool;

a raised section arranged on said second side, said raised section having a shape being different from the shape of said recess, said raised section comprising a plurality of bulges arranged at a radial distance from said longitudinal axis, said bulges being connected by lateral flanks forming recesses between said bulges; and wherein said securing section comprises at least six bulges, each of said bulges forming a pair of bulges with each adjacent bulge, each said pair of adjacent bulges being connected by lateral flanks extending from said pair of adjacent bulges toward said longitudinal axis and converging in a common apex.

25. The adapter of claim 24, wherein said bulges define a first circle having a first diameter, and wherein said apexes define a second circle having a second diameter, the ratio of said first and second diameters defining a diameter ratio, said diameter ratio being approximately 4 to 6.

26. The adapter of claim 25, wherein said diameter ratio is 4.5 to 5.5.

27. The adapter of claim 26, wherein said diameter ratio is approximately 5.1.

28. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side, and having a certain shape for engaging said securing section of said power tool;

a raised section arranged on said second side, said raised section having a shape being different from the shape of said recess, said raised section comprising a plurality of bulges arranged at a radial distance from said longitudinal axis, said bulges being connected by lateral flanks forming recesses between said bulges;

wherein said raised section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said bulges are configured as rounded tips.

29. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side, and having a certain shane for engaging said securing section of said power tool;

a raised section arranged on said second side, said raised section having a shape being different from the shape of said recess, said raised section comrisi a plurality of bulges arranged at a radial distance from said longitudinal axis, said bulges being connected by lateral flanks forming recesses between said bulges;

wherein said raised section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said lateral flanks are arch-shaped.

30. An adapter for securing a tool having a receiving opening to a securing section of a drive shaft of a power tool, said adapter comprising:

an adapter disk comprising a longitudinal axis and having a first side facing said tool;

a recess arranged on said first side, and having a certain shape for engaging said securing section of said power tool;

a raised section arranged on said second side, said raised section having a shape being different from the shape of said recess, said raised section comprising a plurality of bulges arranged at a radial distance from said longitudinal axis, said bulges being connected by lateral flanks forming recesses between said bulges;

wherein said raised section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said lateral flanks are circular arc-shaped.

31. An adapter for securing a tool having a receiving opening to a securing section of a drive shaft of a power tool, said adapter comprising:

an adapter disk comprising a longitudinal axis and having a first side facing said power tool and a second side facing said tool; a recess arranged on said first side, and having a certain shape for engaging said securing section of said power tool;

a raised section arranged on said second side, said raised section having a shape being different from the shape of said recess, said raised section comprising a plurality of bulges arranged at a radial distance from said longitudinal axis, said bulges being connected by lateral flanks forming recesses between said bulges;

wherein said raised section comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex and wherein said bulges have a circular arc shape having a certain radius, the ratio between said first diameter and said radius being approximately 30 to 46.

32. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side and having a certain shape, said recess comprising a plurality of bulges arranged at a radial distance from said longitudinal axis, said bulges being connected by lateral flanks forming recesses between said bulges; and a raised section arranged on said second side and having a shape being different from the shape of said recess;

wherein said recess comprises at least six bulges, each of said bulges forming a pair of bulges with each adjacent bulge, each said pair of adjacent bulges being connected by lateral flanks extending from said pair of adjacent bulges toward said longitudinal axis and converging in a common apex.

33. The adapter of claim 32, wherein said bulges define a first circle having a first diameter, and wherein said apexes define a second circle having a second diameter, the ratio of said first and second diameters defining a diameter ratio, said diameter ratio being approximately 4 to 6.

34. The adapter of claim 33, wherein said diameter ratio is 4.5 to 5.5.

35. The adapter of claim 34, wherein said diameter ratio is approximately 5.1.

36. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side and having a certain shape, said recess comprising a plurality of bulges arranged at a radial distance from said longitudinal axis, said bulges being connected by lateral flanks forming recesses between said bulges; and a raised section arranged on said second side and having a shane being different from the shape of said recess;

wherein said recess comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said bulges are configured as rounded tips.

37. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side and having a certain shape, said recess comprising a plurality of bulges arranged at a radial distance from said longitudinal axis, said bulges being connected by lateral flanks forming recesses between said bulges; and a raised section arranged on said second side and having a shape being different from the shape of said recess;

wherein said recess comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said lateral flanks are arch-shaped.

38. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side and having a certain shape, said recess comprising a plurality of bulges arranged at a radial distance from said longitudinal axis, said bulges being connected by lateral flanks forming recesses between said bulges; and a raised section arranged on said second side and having a shape being different from the shape of said recess;

wherein said recess comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said lateral flanks are circular arc-shaped.

39. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side and having a certain shape, said recess comprising a plurality of bulges arranged at a radial distance from said longitudinal axis, said bulges being connected by lateral flanks forming recesses between said bulges; and a raised section arranged on said second side and having a shape being different from the shape of said recess;

wherein said recess comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and wherein said bulges have, in part, a circular arc shape having a certain radius, the ratio between said first diameter and said radius being approximately 30 to 46.

40. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side and having a certain shape, said recess comprising a plurality of bulges arranged at a radial distance from said longitudinal axis, said bulges being connected by lateral flanks forming recesses between said bulges; and a raised section arranged on said second side and having a shape being different from the shape of said recess;

wherein said recess comprises at least three bulges, each of said bulges forming a pair of bulges with each adjacent bulge, each said pair of adjacent bulges being continuously connected by lateral flanks extending from said pair of adjacent bulges toward said longitudinal axis and converging in a common apex; and a threaded blind hole arranged on said drive shaft, and further comprising a securing screw having a threaded portion adapted for screwing into said threaded blind hole for securing a tool on said securing section.

41. The adapter of claim 40, further comprising a clamping flange having a central opening for inserting said threaded portion of said securing screw therethrough and for srewing said threaded portion of said securing screw into said threaded blind hole, said clamping flange further comprising an annular protrusion on its side facing said drive shaft, said annular protrusion being dimensioned for pressing a tool against said drive shaft when tightening said securing screw.

42. The adapter of claim 41, wherein said clamping flange is secured rotatably to said securing screw.

43. The adapter of claim 40, further comprising a spring element arranged between said securing screw and said adapter disk.

44. The adapter of claim 40, wherein said adapter disk comprises a laterally projecting section being configured for axially supporting said tool thereon.

45. The adapter of claim 44, wherein said securing srew comprises a head being dimensioned for supporting said tool against said laterally projecting section of said adapter disk.

46. The adapter of claim 40 wherein said securing srew comprises a head being dimensioned for supporting said tool against said drive shaft.

47. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side and having a certain shape, said recess comprising a plurality of bulges arranged at a radial distance from said longitudinal axis, said bulges being connected by lateral flanks forming recesses between said bulges; and a raised section arranged on said second side and having a shape being substantially identical to the shape of said recess, but being angularly displaced with respect thereto.

48. The adapter of claim 47, wherein said recess comprises six bulges, each of said bulges forming a pair of bulges with each adjacent bulge, each said pair of adjacent bulges being continuously connected by lateral flanks extending from said pair of adjacent bulges toward said longitudinal axis and converging in a common apex, and wherein said raised section is angularly displaced by 30° with respect to said recess.

49. The adapter of claim 48, wherein said bulges are configured as rounded tips.

50. A power tool comprising a motor-driven drive shaft having a longitudinal axis and having a free end;

a securing section provided on said free end of said drive shaft for engaging a receiving opening provided on said tool;

said securing section comprising six rounded tips arranged at even radial distances from said longitudinal axis, at angular intervals of 60° between each other, each pair of adjacent tips being connected by arch-shaped lateral flanks forming recesses between said tips, said lateral flanks extending from said pair of adjacent tips toward said longitudinal axis and converging in a common apex, wherein said bulges are configured to at least partially fit within the receiving opening.

* * * * *